(12) United States Patent
Yoshida

(10) Patent No.: US 9,214,674 B2
(45) Date of Patent: Dec. 15, 2015

(54) COATED ACTIVE MATERIAL AND LITHIUM SOLID STATE BATTERY

(75) Inventor: Satoshi Yoshida, Susono-shi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/114,837

(22) PCT Filed: May 26, 2011

(86) PCT No.: PCT/JP2011/062121
§ 371 (c)(1),
(2), (4) Date: Oct. 30, 2013

(87) PCT Pub. No.: WO2012/160698
PCT Pub. Date: Nov. 29, 2012

(65) Prior Publication Data
US 2014/0087270 A1    Mar. 27, 2014

(51) Int. Cl.
| H01M 4/38 | (2006.01) |
| H01M 4/36 | (2006.01) |
| H01M 4/58 | (2010.01) |
| H01M 4/505 | (2010.01) |
| H01M 4/525 | (2010.01) |
| H01M 4/485 | (2010.01) |
| H01M 10/052 | (2010.01) |
| H01M 10/0562 | (2010.01) |
| H01M 4/131 | (2010.01) |
| H01M 4/13 | (2010.01) |
| H01M 4/62 | (2006.01) |

(52) U.S. Cl.
CPC ............... *H01M 4/38* (2013.01); *H01M 4/131* (2013.01); *H01M 4/366* (2013.01); *H01M 4/485* (2013.01); *H01M 4/62* (2013.01); *H01M 10/052* (2013.01); *H01M 10/0562* (2013.01); H01M 4/505 (2013.01); H01M 4/525 (2013.01); H01M 4/5825 (2013.01); Y02E 60/122 (2013.01); Y02T 10/7011 (2013.01)

(58) Field of Classification Search
CPC ......... H01M 4/38; H01M 4/366; H01M 4/13; H01M 4/485; H01M 4/5825; H01M 10/052; H01M 10/0562; Y02T 10/7011; Y02E 60/122
USPC .......................................... 429/122, 188, 304
See application file for complete search history.

(56) References Cited

U.S. PATENT DOCUMENTS

| 5,733,685 A * | 3/1998 | Wang ................. C01G 45/1242 |
| | | 423/599 |
| 2002/0141937 A1* | 10/2002 | Howard, Jr. ........... H01M 4/131 |
| | | 423/599 |

(Continued)

FOREIGN PATENT DOCUMENTS

| CN | 101828286 | 9/2010 |
| JP | A-11-167919 | 6/1999 |

(Continued)

*Primary Examiner* — Patrick Ryan
*Assistant Examiner* — Aaron Greso
(74) *Attorney, Agent, or Firm* — Oliff PLC

(57) ABSTRACT

The problem of the present invention is to provide a coated active material having a soft coating layer and capable of improving a contact area. The present invention solves the above-mentioned problem by providing a coated active material comprising a cathode active material and a coating layer for coating the above-mentioned cathode active material, containing an Li ion conductive oxide, wherein the above-mentioned coating layer further contains lithium carbonate.

7 Claims, 1 Drawing Sheet

(56) References Cited

U.S. PATENT DOCUMENTS

| | | |
|---|---|---|
| 2005/0053834 A1* | 3/2005 | Fan et al. ............... 429/217 |
| 2007/0082265 A1 | 4/2007 | Itou et al. |
| 2009/0081554 A1 | 3/2009 | Takada et al. |
| 2010/0221613 A1 | 9/2010 | Ueki et al. |
| 2012/0028128 A1 | 2/2012 | Seino et al. |
| 2012/0052396 A1 | 3/2012 | Tsuchida et al. |

FOREIGN PATENT DOCUMENTS

| | | | | |
|---|---|---|---|---|
| JP | A-2004-119110 | | 4/2004 | |
| JP | A-2005-190996 | | 7/2005 | |
| JP | 2009-152077 | * | 7/2009 | ............. H01M 4/02 |
| JP | A-2010-129471 | | 6/2010 | |
| JP | A-2010-135090 | | 6/2010 | |
| JP | A-2010-177042 | | 8/2010 | |
| JP | A-2010-245038 | | 10/2010 | |
| JP | A-2010-267400 | | 11/2010 | |
| JP | 2011-090877 | * | 5/2011 | ........ H01M 10/0585 |
| JP | 2011-113792 | * | 6/2011 | ............ H01M 4/525 |
| JP | A-2011-113792 | | 6/2011 | |
| WO | WO 2007/004590 A1 | | 1/2007 | |
| WO | WO 2011/065391 | * | 3/2011 | ............. H01M 4/36 |

* cited by examiner

COATED ACTIVE MATERIAL AND LITHIUM SOLID STATE BATTERY

TECHNICAL FIELD

The present invention relates to a coated active material comprising a soft coating layer and capable of improving a contact area.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

In the field of such an all solid state battery, the intention of improving the performance of the all solid state battery has been conventionally attempted while noticing an interface between a cathode active material and a solid electrolyte material. For example, in Patent Literature 1, the all solid state battery such that a reaction inhibition unit having a polyanion structure (such as borate and silicate) including a central element (such as B and Si) with an electronegativity of 1.74 or more, which covalently bonds to plural oxygen elements, is formed at the interface between a cathode active material and a solid electrolyte material is disclosed. This is such that the formation of the reaction inhibition unit having a polyanion structure with high electrochemical stability at the interface between a cathode active material and a solid electrolyte material inhibits interface resistance between a cathode active material and a solid electrolyte material from increasing with time to intend higher durability of the battery.

On the other hand, in Patent Literature 2, it is disclosed that the cathode active material surface of an all solid lithium battery is coated with a lithium ion conductive oxide to inhibit a high resistance layer from being formed at an interface between the cathode active material and a sulfide solid electrolyte.

CITATION LIST

Patent Literature

Patent Literature 1: Japanese Patent Application Publication (JP-A) No. 2010-135090
Patent Literature 2: WO 2007/004590

SUMMARY OF INVENTION

Technical Problem

For example, the increase of interface resistance between a cathode active material and a solid electrolyte material is caused for the reason that both of them react to form a high resistance layer at the interface. As described in Patent Literature 1, the intervention of borate and silicate between a cathode active material and a solid electrolyte material allows a reaction between a cathode active material and a solid electrolyte material to be inhibited. However, in a coated active material such that a cathode active material is coated with a coating layer, in the case of using borate and silicate for the coating layer, the problem arises that the coating layer hardens. The hard coating layer decreases a contact point of one coated active material with another or a coated active material with a solid electrolyte material to bring a possibility of increasing reaction resistance. The present invention has been made in view of the above-mentioned problem, and the main object thereof is to provide a coated active material comprising a soft coating layer and capable of improving a contact area.

Solution to Problem

In order to solve the above-mentioned problem, the present invention provides a coated active material comprising a cathode active material and a coating layer for coating the above-mentioned cathode active material, containing an Li ion conductive oxide, wherein the above-mentioned coating layer further contains lithium carbonate.

According to the present invention, the inclusion of lithium carbonate in the coating layer allows the coating layer to be softened. As a result, a contact area of one coated active material with another or a coated active material with a solid electrolyte material increases to allow reaction resistance to be inhibited.

In the above-mentioned invention, the content of the above-mentioned lithium carbonate is preferably within a range of 0.02% by weight to 1% by weight with respect to the above-mentioned coated active material. The reason therefor is to allow reaction resistance to be further inhibited.

In the above-mentioned invention, the above-mentioned Li ion conductive oxide is preferably at least one of $Li_4SiO_4$—$Li_3BO_3$ and $LiNbO_3$. The reason therefor is to allow interface resistance between a cathode active material and a solid electrolyte material to be effectively inhibited from increasing.

In the above-mentioned invention, the above-mentioned cathode active material is preferably an oxide cathode active material. The reason therefor is to allow the high-capacity cathode active material.

Also, the present invention provides a lithium solid state battery comprising a cathode active material layer containing a cathode active material, an anode active material layer containing an anode active material, and a solid electrolyte layer formed between the above-mentioned cathode active material layer and the above-mentioned anode active material layer, wherein the above-mentioned cathode active material is the above-mentioned coated active material.

According to the present invention, the use of the above-mentioned coated active material allows the lithium solid state battery in which reaction resistance decreases.

In the above-mentioned invention, the above-mentioned coated active material preferably contacts with a sulfide solid electrolyte material. The reason therefor is that the sulfide solid electrolyte material is high in reactivity with the cathode active material, but the use of the coated active material allows interface resistance between the cathode active material and the sulfide solid electrolyte material to be effectively inhibited from increasing.

Advantageous Effects of Invention

The present invention produces the effect such as to allow a coated active material comprising a soft coating layer and capable of improving a contact area.

DESCRIPTION OF EMBODIMENTS

A coated active material and a lithium solid state battery of the present invention are hereinafter described in detail.

A. Coated Active Material

First, a coated active material of the present invention is described. The coated active material of the present invention is a coated active material comprising a cathode active material and a coating layer for coating the above-mentioned cathode active material, containing an Li ion conductive oxide, wherein the above-mentioned coating layer further contains lithium carbonate.

According to the present invention, the inclusion of lithium carbonate in the coating layer allows the coated active material comprising a soft coating layer. As a result, a contact area of one coated active material with another or a coated active material with a solid electrolyte material increases to allow reaction resistance to be inhibited. Li ion conductive oxides such as phosphate, borate and lithium niobate have been conventionally used as a material for the coating layer; however, the coating layer hardens, so that the above-mentioned contact area decreases and reaction resistance is high. On the contrary, in the present invention, the use of lithium carbonate as a softer carbonate than the Li ion conductive oxides allows the coating layer to be softened. Also, in the coated active material of the present invention, the cathode active material is coated with the coating layer containing an Li ion conductive oxide, so that a reaction between the cathode active material and the solid electrolyte material may be inhibited and interface resistance therebetween may be inhibited from increasing.

Figure 1:
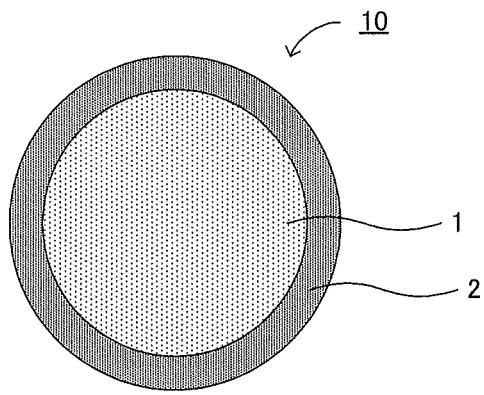
FIG. 1 is a schematic cross-sectional view showing an example of a coated active material of the present invention.

FIG. 1 is a schematic cross-sectional view showing an example of the coated active material of the present invention. A coated active material 10 shown in FIG. 1 comprises a cathode active material 1 and a coating layer 2 for coating the cathode active material 1, containing an Li ion conductive oxide. The present invention is greatly characterized in that the coating layer 2 further contains lithium carbonate.

The coated active material of the present invention is hereinafter described in each constitution.

1. Cathode Active Material

First, the cathode active material in the present invention is described. The cathode active material in the present invention has the function of occluding and releasing Li ions.

The cathode active material in the present invention is not particularly limited but examples thereof include an oxide cathode active material. The reason therefor is to allow the high-capacity cathode active material. Examples of the oxide cathode active material used for the present invention include an oxide cathode active material represented by a general formula $Li_xM_yO_z$ (M is a transition metallic element, $x=0.02$ to 2.2, $y=1$ to 2 and $z=1.4$ to 4). In the above-mentioned general formula, M is preferably at least one kind selected from the group consisting of Co, Mn, Ni, V and Fe, and more preferably at least one kind selected from the group consisting of Co, Ni and Mn. Specific examples of such an oxide cathode active material include rock salt bed type cathode active materials such as $LiCoO_2$, $LiMnO_2$, $LiNiO_2$, $LiVO_2$ and $LiNi_{1/3}Co_{1/3}Mn_{1/3}O_2$, and spinel type cathode active materials such as $LiMn_2O_4$ and $Li(Ni_{0.5}Mn_{1.5})O_4$. Also, examples of the oxide cathode active material except the above-mentioned general formula of $Li_xM_yO_z$ include olivine type cathode active materials such as $LiFePO_4$ and $LiMnPO_4$, and Si-containing cathode active materials such as $Li_2FeSiO_4$ and $Li_2MnSiO_4$.

Examples of the shape of the cathode active material include a particulate shape, and preferably a perfectly spherical shape or an elliptically spherical shape, above all. Also, in the case where the cathode active material is in a particulate shape, the average particle diameter thereof ($D_{50}$) is, for example, preferably within a range of 0.1 μm to 50 μm.

2. Coating Layer

Next, the coating layer in the present invention is described. The coating layer in the present invention coats the above-mentioned active material, and contains an Li ion conductive oxide. Also, the above-mentioned coating layer further contains lithium carbonate.

In the present invention, the inclusion of lithium carbonate ($Li_2CO_3$) in the coating layer allows a soft coating layer. The reason therefor is conceived to be that lithium carbonate is a carbonate and soft as compared with an Li ion conductive oxide. The content of lithium carbonate in the present invention is not particularly limited if the content allows the coating layer to be softened, but is, for example, preferably 0.02% by weight or more, more preferably 0.1% by weight or more, and far more preferably 0.3% by weight or more with respect to the coated active material. The reason therefor is that too small ratio of lithium carbonate brings a possibility of not sufficiently allowing the coating layer to be softened. On the other hand, the content of lithium carbonate in the present invention is, for example, preferably 3% by weight or less, more preferably 1.5% by weight or less, and far more preferably 1% by weight or less with respect to the coated active material. The reason therefor is that too large ratio of lithium carbonate brings a possibility of deteriorating Li ion conductivity and electron conduction of the coating layer to increase reaction resistance though lithium carbonate allows the coating layer to be softened. Incidentally, the content of lithium carbonate may be determined by fixing the quantity of $CO_3^{2-}$ in the coated active material with the use of ion chromatography, for example.

The Li ion conductive oxide in the present invention is not particularly limited if the Li ion conductive oxide may compose the coating layer, but examples thereof include an Li ion conductive oxide represented by a general formula $Li_xAO_y$ (therein, A is at least one selected from the group consisting of B, C, Al, Si, P, S, Ti, Zr, Nb, Mo, Ta and W, and "x" and "y" are positive numbers), and specific examples include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$. Also, the Li ion conductive oxide may be a composite compound of the Li ion conductive oxide. Examples of such a composite compound include $Li_4SiO_4$—$Li_3BO_3$ and $Li_4SiO_4$—$Li_3PO_4$. Above all, in the present invention, the Li ion conductive oxide is preferably at least one of $Li_4SiO_4$—$Li_3BO_3$ and $LiNbO_3$. The reason therefor is to allow interface resistance between a cathode active material and a solid electrolyte material to be effectively inhibited from increasing.

The thickness of the coating layer may be a thickness such as to be capable of inhibiting a cathode active material and a solid electrolyte material from reacting; for example, preferably within a range of 0.1 nm to 100 nm, and more preferably within a range of 1 nm to 20 nm. The reason therefor is that too thin coating layer brings a possibility that a cathode active material and a solid electrolyte material react, while too thick coating layer brings a possibility that Li ion conductivity and electron conduction deteriorate. Incidentally, examples of a measuring method for the thickness of the coating layer include a transmission electron microscope (TEM). Also, the coverage factor of the coating layer on the cathode active material surface is preferably high from the viewpoint of inhibiting interface resistance from increasing; specifically, preferably 50% or more, and more preferably 80% or more. Also, the coating layer may coat the whole surface of the cathode active material. Incidentally, examples of a measuring method for the coverage factor of the coating layer include a transmission electron microscope (TEM) and an X-ray photoelectron spectroscopy (XPS).

3. Coated Active Material

The coated active material of the present invention is ordinarily used for a lithium solid state battery. The lithium solid state battery is described in detail in the after-mentioned "B. Lithium solid state battery". Also, a method for producing the coated active material is not particularly limited if the method allows the above-mentioned coated active material, but examples thereof include a tumbling flow coating method (a sol-gel method), a mechano-fusion method, a CVD method and a PVD method.

In a method for producing the coated active material by using a tumbling flow coating method, for example, in the case where the Li ion conductive oxide composing the coating layer is $Li_4SiO_4$—$Li_3BO_3$, first, a mixed solution in which Li source, B source and Si source are dissolved in a solvent is stirred and hydrolyzed to thereby prepare a coating liquid for forming the coating layer. Next, a cathode active material is coated with the coating liquid for forming the coating layer by a tumbling flow coating method. In addition, the cathode active material whose surface is coated with the coating liquid for forming the coating layer is burned to thereby form the coating layer for coating the cathode active material and then obtain the coated active material. Here, examples of the Li source include Li salt or Li alkoxide; specifically, lithium acetate ($CH_3COOLi$) may be used. Examples of the B source and Si source include a substance having an OH group at the end or a substance which hydrolyzes into a hydroxide; specifically, boric acid ($H_3BO_3$) and tetraethoxysilane ($Si(C_2H_5O)_4$) may be used respectively. The solvent is not particularly limited if the solvent is an organic solvent such as to allow the Li source, B source and Si source to be dissolved, but examples thereof include ethanol. Incidentally, the above-mentioned solvent is preferably an anhydrous solvent. Also, for example, nitrogen atmosphere is preferable in coating by a tumbling flow coating method. The reason therefor is to allow the coating liquid for forming the coating layer and moisture and carbon dioxide in the air to be inhibited from reacting.

The hydrolysis temperature is, for example, preferably within a range of 5° C. to 40° C. Also, the hydrolysis time (stirring time) is, for example, preferably within a range of 1 hour to 72 hours.

On the other hand, the burning temperature is, for example, preferably within a range of 250° C. to 500° C. Also, the burning time is, for example, preferably within a range of 0.5 hour to 12 hours. Also, the burning atmosphere is preferably in the presence of oxygen and specific examples thereof include an air atmosphere and a pure oxygen atmosphere. Also, examples of the burning method include a method by using a burning furnace such as a muffle furnace.

With regard to the coated active material of the present invention, the coating layer contains lithium carbonate. A method for making the coating layer contain lithium carbonate is such that lithium carbonate may be synthesized by adding the Li source (such as lithium acetate and ethoxylithium) more excessively than stoichiometric composition ratio of an intended Li ion conductive oxide to oxidize the Li source remaining in a reaction with the B source and Si source. Also, lithium carbonate may be contained by a reaction between the coating liquid for forming the coating layer and moisture and carbon dioxide in the air in coating the cathode active material with the coating liquid for forming the coating layer. Also, lithium carbonate may be intentionally added to the Li ion conductive oxide.

B. Lithium Solid State Battery

Next, a lithium solid state battery of the present invention is described. The lithium solid state battery of the present invention is a lithium solid state battery comprising a cathode active material layer containing a cathode active material, an anode active material layer containing an anode active material, and a solid electrolyte layer formed between the above-mentioned cathode active material layer and the above-mentioned anode active material layer, wherein the above-mentioned cathode active material is the above-mentioned coated active material.

According to the present invention, the use of the above-mentioned coated active material allows the lithium solid state battery in which reaction resistance decreases.

Figure 2:
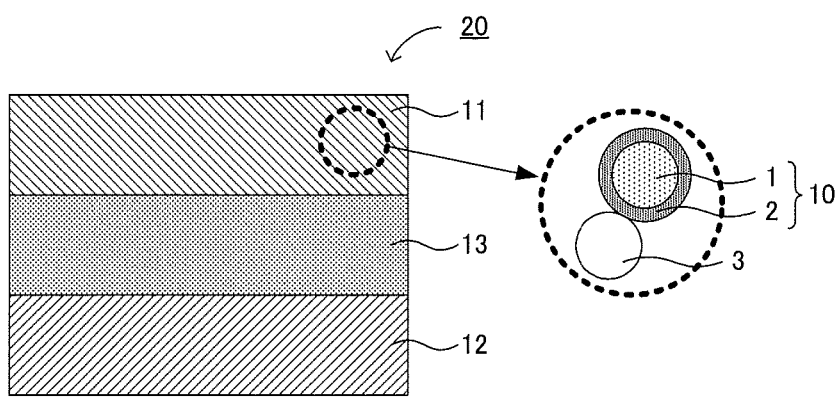
FIG. 2 is a schematic cross-sectional view showing an example of a power generating element of a lithium solid state battery of the present invention.

FIG. 2 is a schematic cross-sectional view showing an example of a power generating element of the lithium solid state battery of the present invention. A power generating element 20 of the lithium solid state battery shown in FIG. 2 comprises a cathode active material layer 11, an anode active material layer 12, and a solid electrolyte layer 13 formed between the cathode active material layer 11 and the anode active material layer 12. In addition, the cathode active material layer 11 has a coated active material 10 provided with a cathode active material 1 and a coating layer 2, and a solid electrolyte material 3.

The lithium solid state battery of the present invention is hereinafter described in each constitution.

1. Cathode Active Material Layer

First, the cathode active material layer in the present invention is described. The cathode active material layer in the present invention is a layer containing at least the cathode active material, and may further contain at least one of a solid electrolyte material, a conductive material and a binder as required.

The cathode active material in the present invention is the coated active material described in the above-mentioned "A. Coated active material". The content of the cathode active material in the cathode active material layer is, for example, preferably within a range of 10% by weight to 99% by weight, and more preferably within a range of 20% by weight to 90% by weight. Also, the cathode active material layer preferably contains a solid electrolyte material. The reason therefor is to allow Li ion conductivity in the cathode active material layer to be improved. Incidentally, the solid electrolyte material contained in the cathode active material layer is the same as the solid electrolyte material described in the after-mentioned "3. Solid electrolyte layer". The content of the solid electrolyte material in the cathode active material layer is, for example, preferably within a range of 1% by weight to 90% by weight, and more preferably within a range of 10% by weight to 80% by weight.

Also, in the present invention, the above-mentioned coated active material preferably contacts with a sulfide solid electrolyte material. The reason therefor is that the sulfide solid electrolyte material is high in reactivity with the cathode active material, but the use of the coated active material allows interface resistance between the cathode active material and the sulfide solid electrolyte material to be effectively inhibited from increasing. Also, on the occasion, the cathode active material supporting the coating layer is preferably an oxide cathode active material. The reason therefor is that the sulfide solid electrolyte material and the oxide cathode active material react easily and this reaction may be inhibited by the coating layer. Examples of an aspect such that the coated active material and the sulfide solid electrolyte material contact include an aspect such that the cathode active material layer contains both the coated active material and the sulfide solid electrolyte material, and both of them contact in the cathode active material layer. Also, other examples of the above-mentioned aspect include an aspect such that the cathode active material layer contains the coated active material, the solid electrolyte layer contains the sulfide solid electrolyte material, and both of them contact at an interface between the cathode active material layer and the solid electrolyte layer.

The cathode active material layer in the present invention may further contain a conductive material. The addition of the conductive material allows electrical conductivity of the cathode active material layer to be improved. Examples of the conductive material include acetylene black, Ketjen Black and carbon fiber. Also, the cathode active material layer may further contain a binder. Examples of the binder include fluorine-containing binders such as PTFE and PVDF. Also, the thickness of the cathode active material layer varies with constitutions of an intended lithium solid state battery, and is preferably within a range of 0.1 μm to 1000 μm, for example.

2. Anode Active Material Layer

Next, the anode active material layer in the present invention is described. The anode active material layer in the present invention is a layer containing at least the anode active material, and may further contain at least one of a solid electrolyte material, a conductive material and a binder as required.

Examples of the anode active material include a metal active material and a carbon active material. Examples of the metal active material include Li alloy, In, Al, Si, and Sn. On the other hand, examples of the carbon active material include graphite such as mesocarbon microbeads (MCMB) and high orientation property graphite (HOPG), and amorphous carbon such as hard carbon and soft carbon. Incidentally, SiC may be also used as the anode active material. The content of the anode active material in the anode active material layer is, for example, preferably within a range of 10% by weight to 99% by weight, and more preferably within a range of 20% by weight to 90% by weight.

The anode active material layer preferably contains a solid electrolyte material. The reason therefor is to allow Li ion conductivity in the anode active material layer to be improved. Incidentally, the solid electrolyte material contained in the anode active material layer is the same as the solid electrolyte material described in the after-mentioned "3. Solid electrolyte layer". The content of the solid electrolyte material in the anode active material layer is, for example, preferably within a range of 1% by weight to 90% by weight, and more preferably within a range of 10% by weight to 80% by weight.

Incidentally, the conductive material and the binder used for the anode active material layer are the same as the above-mentioned case in the cathode active material layer. Also, the thickness of the anode active material layer varies with constitutions of an intended lithium solid state battery, and is preferably within a range of 0.1 μm to 1000 μm, for example.

3. Solid Electrolyte Layer

Next, the solid electrolyte layer in the present invention is described. The solid electrolyte layer in the present invention is a layer formed between the cathode active material layer and the anode active material layer, and a layer containing at least the solid electrolyte material. The solid electrolyte material is not particularly limited if the solid electrolyte material has Li ion conductivity, but examples thereof include a sulfide solid electrolyte material and an oxide solid electrolyte material, and preferably a sulfide solid electrolyte material, above all. The reason therefor is to be high in Li ion conductivity as compared with the oxide solid electrolyte material. Also, the sulfide solid electrolyte material is so higher in reactivity than the oxide solid electrolyte material as to react easily with the cathode active material and form a high resistive layer easily at an interface with the cathode active material. On the contrary, in the present invention, the use of the coated active material allows interface resistance between the cathode active material and the sulfide solid electrolyte material to be effectively inhibited from increasing.

Examples of the sulfide solid electrolyte material include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ ("m" and "n" are positive numbers; Z is any of Ge, Zn and Ga), $Li_2S$—$GeS_2$, $Li_2S$—$SiS_2$—$Li_3PO_4$, and $Li_2S$—$SiS_2$—$Li_xMO_y$ ("x" and "y" are positive numbers; M is any of P, Si, Ge, B, Al, Ga and In). Incidentally, the description of the above-mentioned "$Li_2S$—$P_2S_5$" signifies the sulfide solid electrolyte material obtained by using a raw material composition containing $Li_2S$ and $P_2S_5$, and other descriptions signify similarly.

Also, in the case where the sulfide solid electrolyte material is obtained by using a raw material composition containing $Li_2S$ and $P_2S_5$, the ratio of $Li_2S$ to the total of $Li_2S$ and $P_2S_5$ is, for example, preferably within a range of 70 mol % to 80 mol %, more preferably within a range of 72 mol to 78 mol %, and far more preferably within a range of 74 mol to 76 mol %. The reason therefor is to allow the sulfide solid electrolyte material having an ortho-composition or a composition in the neighborhood of it and allow the sulfide solid electrolyte material with high chemical stability. Here, ortho generally signifies oxo acid which is the highest in degree of hydration among oxo acids obtained by hydrating the same oxide. In the present invention, a crystal composition to which $Li_2S$ is added most among sulfides is called an ortho-composition. $Li_3PS_4$ corresponds to the ortho-composition in the $Li_2S$—$P_2S_5$ system. In the case of an $Li_2S$—$P_2S_5$-based sulfide solid electrolyte material, the ratio of $Li_2S$ and $P_2S_5$ such as to allow the ortho-composition is $Li_2S:P_2S_5$=75:25 on a molar basis. Incidentally, also in the case of using $Al_2S_3$ and $B_2S_3$ instead of $P_2S_5$ in the above-mentioned raw material composition, the preferable range is the same. $Li_3AlS_3$ corresponds to the ortho-composition in the $Li_2S$—$Al_2S_3$ system and $Li_3BS_3$ corresponds to the ortho-composition in the $Li_2S$—$B_2S_3$ system.

Also, in the case where the sulfide solid electrolyte material is obtained by using a raw material composition containing $Li_2S$ and $SiS_2$, the ratio of $Li_2S$ to the total of $Li_2S$ and $SiS_2$ is, for example, preferably within a range of 60 mol % to 72 mol %, more preferably within a range of 62 mol % to 70 mol %, and far more preferably within a range of 64 mol % to 68 mol %. The reason therefor is to allow the sulfide solid electrolyte material having an ortho-composition or a composition in the neighborhood of it and allow the sulfide solid electrolyte material with high chemical stability. $Li_4SiS_4$ corresponds to the ortho-composition in the $Li_2S$—$SiS_2$ system. In the case of an $Li_2S$—$SiS_2$-based sulfide solid electrolyte material, the ratio of $Li_2S$ and $SiS_2$ such as to allow the ortho-composition is $Li_2S:SiS_2=66.6:33.3$ on a molar basis. Incidentally, also in the case of using $GeS_2$ instead of $SiS_2$ in the above-mentioned raw material composition, the preferable range is the same. $Li_4GeS_4$ corresponds to the ortho-composition in the $Li_2S$—$GeS_2$ system.

Also, in the case where the sulfide solid electrolyte material is obtained by using a raw material composition containing LiX (X=Cl, Br and I), the ratio of LiX is, for example, preferably within a range of 1 mol % to 60 mol %, more preferably within a range of 5 mol % to 50 mol %, and far more preferably within a range of 10 mol % to 40 mol %.

Also, the sulfide solid electrolyte material may be sulfide glass, crystallized sulfide glass, or a crystalline material (a material obtained by a solid phase method).

Examples of the shape of the sulfide solid electrolyte material in the present invention include a particulate shape, preferably a perfectly spherical shape or an elliptically spherical shape, above all. Also, in the case where the above-mentioned sulfide solid electrolyte material is in a particulate shape, the average particle diameter thereof ($D_{50}$) is not particularly limited but preferably 40 μm or less, more preferably 20 μm or less, and far more preferably 10 μm or less. The reason therefor is to allow easy improvement in filling factor of the solid electrolyte layer. On the other hand, the above-mentioned average particle diameter is preferably 0.01 μm or more, and more preferably 0.1 μm or more. Incidentally, the above-mentioned average particle diameter may be determined by a particle size analyzer, for example. Also, Li ion conductivity at normal temperature of the sulfide solid electrolyte material is, for example, preferably $1\times10^{-4}$ S/cm or more, and more preferably $1\times10^{-3}$ S/cm or more.

The content of the solid electrolyte material in the solid electrolyte layer is, for example, preferably within a range of 10% by weight to 100% by weight, and more preferably within a range of 50% by weight to 100% by weight. Also, the solid electrolyte layer may contain a binder. Examples of the binder include fluorine-containing binders such as PTFE and PVDF. Also, the thickness of the solid electrolyte layer is not particularly limited but is, for example, preferably within a range of 0.1 μm to 1000 μm, and more preferably within a range of 0.1 μm to 300 μm.

4. Other Constitutions

The lithium solid state battery of the present invention comprises at least the above-mentioned cathode active material layer, anode active material layer and solid electrolyte layer, ordinarily further comprising a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Also, the thickness and shape of the cathode current collector and the anode current collector are preferably selected properly in accordance with uses of the lithium solid state battery and other factors. Also, a battery case of a general lithium solid state battery may be used for a battery case used for the present invention. Examples of the battery case include a battery case made of SUS.

5. Lithium Solid State Battery

The lithium solid state battery of the present invention may be a primary battery or a secondary battery, and preferably a secondary battery among them. The reason therefor is to be repeatedly charged and discharged and be useful as a car-mounted battery, for example. Examples of the shape of the lithium solid state battery of the present invention include a coin shape, a laminate shape, a cylindrical shape and a rectangular shape. Also, a producing method for the lithium solid state battery of the present invention is not particularly limited if the method is a method such as to allow the above-mentioned lithium solid state battery, but the same method as a producing method for a general lithium solid state battery may be used.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

(Preparation of Coating Liquid for Forming Coating Layer)

Boric acid ($H_3BO_3$, manufactured by Wako Pure Chemical Industries, Ltd.) and tetraethoxysilane (Si $(C_2H_5O)_4$, manufactured by Kojundo Chemical Lab. Co., Ltd.) were dissolved in 1800 mL of anhydrous ethanol ($C_2H_5OH$, manufactured by Wako Pure Chemical Industries, Ltd.) so as to become 0.066 mol/L each, and 10.8 g of lithium acetate ($CH_3COOLi$, manufactured by Wako Pure Chemical Industries, Ltd.) was further dissolved and mixed therein. This mixed solution was stirred at a temperature of 19° C. for 24 hours to thereby obtain a coating liquid for forming a coating layer.

(Production of Coated Active Material)

1.25 kg of a cathode active material ($LiNi_{1/3}Co_{1/3}Mn_{1/3}O_2$) was flown in a tumbling flow bed coating apparatus (manufactured by Powrex Corp.) to coat the above-mentioned coating liquid for forming a coating layer on the surface of the cathode active material under a nitrogen atmosphere. Thereafter, the cathode active material was burned in the air at a temperature of 400° C. for 1 hour by using a muffle furnace to thereby form a coating layer for coating the cathode active material and then obtain a coated active material.

(Synthesis of Solid Electrolyte Material)

First, lithium sulfide ($Li_2S$) and phosphorus pentasulfide ($P_2S_5$) were used as a starting material. These powders were weighed in a glove box under an Ar atmosphere (dew point: −70° C.) so as to become a molar ratio of $Li_2S:P_2S_5=75:25$, and mixed by an agate mortar to obtain a raw material composition. Next, 1 g of the obtained raw material composition was projected into a 45-ml zirconia pot, and zirconia ball (ϕ=10 mm, 10 pieces) was further projected thereinto to hermetically seal the pot completely (Ar atmosphere). This pot was mounted on a planetary ball milling machine (P7™ manufactured by FRITSCH JAPAN CO., LTD.) to perform mechanical milling for 40 hours at the number of weighing table revolutions of 370 rpm and then obtain a solid electrolyte material (75Li$_2$S—25P$_2$S$_5$, sulfide glass).

(Production of Lithium Solid State Battery)

First, the above-mentioned coated active material and 75Li$_2$S—25P$_2$S$_5$ were mixed at a weight ratio of 7:3 to obtain a cathode mix. Next, a power generating element 20 of a lithium solid state battery as shown in the above-mentioned FIG. 2 was produced by using a pressing machine. The above-mentioned cathode mix, graphite (MF-6™, manufactured by Mitsubishi Chemical Corporation), and 75Li$_2$S—25P$_2$S$_5$ were used as a material composing a cathode active material layer 11, a material composing an anode active material layer 12, and a material composing a solid electrolyte layer 13, respectively. A lithium solid state battery was produced by using this power generating element.

Examples 2 to 5

A lithium solid state battery was produced in the same manner as Example 1 except for modifying the lithium acetate amount into 32.3 g, 53.9 g, 75.5 g and 97.0 g in the preparation of the coating liquid for forming a coating layer.

Example 6

A lithium solid state battery was produced in the same manner as Example 1 except for modifying the lithium acetate amount into 97.0 g in the preparation of the coating liquid for forming a coating layer and performing lithium carbonate extraction treatment after burning in the production of the coated active material. Incidentally, the lithium carbonate extraction treatment was performed in such a manner that 1 g of the coated active material was poured into 100 mL of pure water subject to inert gas replacement, filtered after stirred for 5 minutes, and dried in a vacuum at a temperature of 80° C.

Example 7

A lithium solid state battery was produced in the same manner as Example 1 except for performing the preparation of the coating liquid for forming a coating layer and the production of the coated active material in the following manner.

(Preparation of Coating Liquid for Forming Coating Layer)

Pentaethoxyniobium (Nb(C$_2$H$_5$O)$_5$, manufactured by Kojundo Chemical Lab. Co., Ltd.) and ethoxylithium (Li(C$_2$H$_5$O), manufactured by Wako Pure Chemical Industries, Ltd.) were dissolved and mixed in 500 mL of anhydrous ethanol (C$_2$H$_5$OH, manufactured by Wako Pure Chemical Industries, Ltd.) so as to become 0.6 mol/L each. This mixed solution was stirred at a temperature of 25° C. for 3 hours to thereby obtain a coating liquid for forming a coating layer.

(Production of Coated Active Material)

1 kg of a cathode active material (LiNi$_{1/3}$Co$_{1/3}$Mn$_{1/3}$O$_2$) was flown in a tumbling flow bed coating apparatus (manufactured by Powrex Corp.) to coat the above-mentioned coating liquid for forming a coating layer on the surface of the cathode active material under a nitrogen atmosphere. Thereafter, the cathode active material was burned in the air at a temperature of 350° C. for 5 hours by using a muffle furnace to thereby form a coating layer for coating the cathode active material and then obtain a coated active material.

Example 8

A lithium solid state battery was produced in the same manner as Example 7 except for further dissolving and mixing 69.0 g of lithium acetate in the preparation of the coating liquid for forming a coating layer.

Comparative Example 1

A lithium solid state battery was produced in the same manner as Example 7 except for further mixing 69.0 g of lithium acetate in the preparation of the coating liquid for forming a coating layer and performing lithium carbonate extraction treatment in the production of the coated active material. Incidentally, the lithium carbonate extraction treatment is the same as the above-mentioned contents.

[Evaluations]

(Quantitative Determination of Lithium Carbonate)

Ion chromatography measurement was performed by using the coated active material produced in Examples 1 to 8 and Comparative Example 1 to calculate the lithium carbonate amount by fixing the quantity of $CO_3^{2-}$. Incidentally, DX500™ manufactured by Dionex Corporation was used for a measuring apparatus, and the measurement conditions were such that ICE-AS1 was used for a column and octanesulfonic acid was used for a carrier liquid (eluant), and the ion chromatography measurement was performed at room temperature. The results are shown in Table 1 and FIG. 3.

(Reaction Resistance Measurement)

Reaction resistance measurement was performed by using the lithium solid state battery obtained in Examples 1 to 8 and Comparative Example 1. The reaction resistance of the battery was calculated by performing complex impedance measurement after adjusting electric potential of the lithium solid state battery to 3.7 V. Incidentally, the reaction resistance was calculated from a diameter of an arc of the impedance curve. The results are shown in Table 1 and FIG. 3.

TABLE 1

| | Coating layer | Lithium carbonate amount [wt %] | Reaction resistance [Ω · cm$^2$] |
|---|---|---|---|
| Example 1 | Li$_4$SiO$_4$—Li$_3$BO$_3$ | 0.3 | 109 |
| Example 2 | Li$_4$SiO$_4$—Li$_3$BO$_3$ | 0.8 | 119 |
| Example 3 | Li$_4$SiO$_4$—Li$_3$BO$_3$ | 1.1 | 298 |
| Example 4 | Li$_4$SiO$_4$—Li$_3$BO$_3$ | 1.4 | 382 |
| Example 5 | Li$_4$SiO$_4$—Li$_3$BO$_3$ | 2.6 | 405 |
| Example 6 | Li$_4$SiO$_4$—Li$_3$BO$_3$ | 0.02 | 421 |
| Example 7 | LiNbO$_3$ | 0.5 | 36 |
| Example 8 | LiNbO$_3$ | 1.2 | 223 |
| Comparative Example 1 | LiNbO$_3$ | 0 | 788 |

Figure 3:
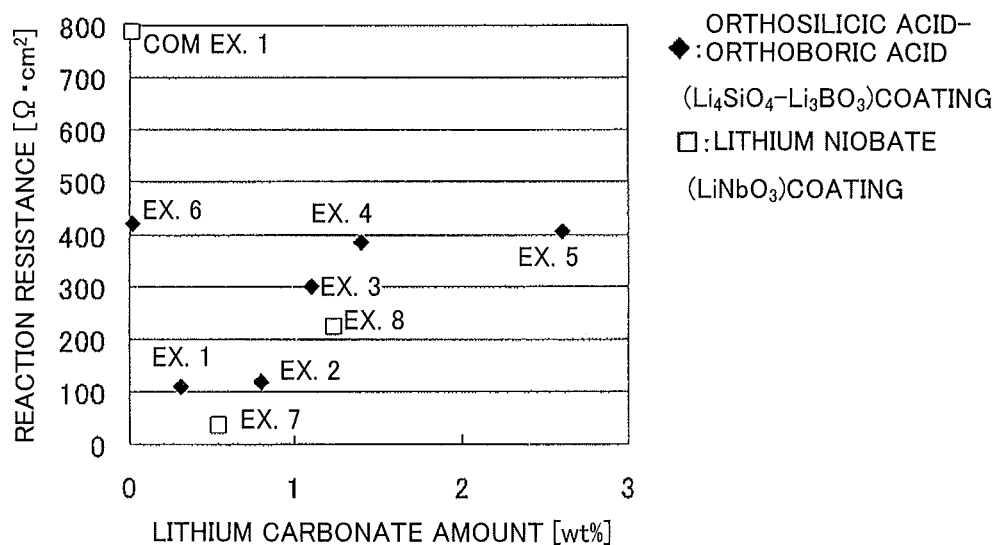
FIG. 3 is a graph showing a relation between reaction resistance and lithium carbonate amount of a lithium solid state battery obtained in Examples 1 to 8 and Comparative Example 1.

As shown in Table 1 and FIG. 3, in Examples 1 to 8, it was confirmed that lithium carbonate was contained in the coating layer of the coated active material and the reaction resistance decreased as compared with Comparative Example 1 in which lithium carbonate was not contained in the coating layer of the coated active material. In particular, in Examples 1, 2 and 7, the reaction resistance decreased remarkably. The reason therefor is conceived to be that a soft coating layer was obtained because lithium carbonate was contained in the coating layer. Incidentally, in Examples 4 and 5, the reaction resistance decreased less; the reason therefor is conceived to be that Li ion conduction and electron conduction were inhibited because the content of lithium carbonate was large though the coating layer was softened by lithium carbonate.

Also, in Example 6, it is conceived that the reaction resistance decreased because lithium carbonate remained by a slight amount though the lithium carbonate extraction treatment was performed.

REFERENCE SIGNS LIST

1 ... cathode active material
2 ... coating layer
3 ... solid electrolyte material
10 ... coated active material
11 ... cathode active material layer
12 ... anode active material layer
13 ... solid electrolyte layer
20 ... power generating element of lithium solid state battery

What is claimed is:

1. A coated active material comprising a cathode active material in a particle shape and a coating layer for coating the cathode active material, containing a Li ion conductive oxide,
wherein the coating layer further contains lithium carbonate, and
a content of the lithium carbonate is within a range of 0.02% by weight to 1% by weight with respect to the coated active material.

2. The coated active material according to claim 1, wherein the Li ion conductive oxide is at least one of $Li_4SiO_4$—$Li_3BO_3$ and $LiNbO_3$.

3. The coated active material according to claim 1, wherein the cathode active material is an oxide cathode active material.

4. A lithium solid state battery comprising a cathode active material layer containing a cathode active material, an anode active material layer containing an anode active material, and a solid electrolyte layer formed between the cathode active material layer and the anode active material layer;
wherein the cathode active material is the coated active material according to claim 1.

5. The lithium solid state battery according to claim 4, wherein the coated active material contacts with a sulfide solid electrolyte material.

6. The coated active material according to claim 1, wherein a coverage factor of the coating layer on a surface of the cathode active material is 50% or more.

7. The coated active material according to claim 1, wherein the content of the lithium carbonate with respect to the coated active material is within the range of 0.3% by weight to 0.8% by weight.

* * * * *